Figure 1:
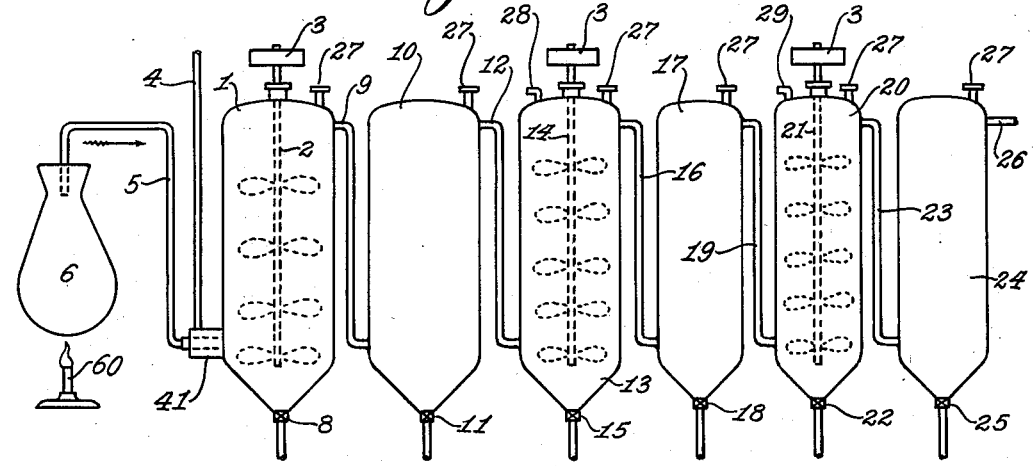

March 19, 1935.  W. W. GARY  1,994,511

PROCESS OF TREATING PETROLEUM

Filed Oct. 16, 1929

Inventor:
WRIGHT W. GARY,
By John N Bruninga
His Attorney.

Patented Mar. 19, 1935

1,994,511

UNITED STATES PATENT OFFICE 1,994,511

PROCESS OF TREATING PETROLEUM

Wright W. Gary, Beverly Hills, Calif., assignor of one-half to Charles O. Middleton, Beverly, Hills, Calif.

Application October 16, 1929, Serial No. 399,917

5 Claims. (Cl. 196—40)

This invention relates to the treatment of petroleum in order to separate therefrom more particularly the sulfur compounds and to stabilize and improve the petroleum.

In my Patent No. 1,677,440, granted July 17, 1928, the petroleum is contacted with sulfuric anhydrid more particularly for the purpose of removing the sulfur compounds and stabilizing and improving the petroleum. In the particular embodiment described in the patent, the sulfuric anhydrid is maintained in a dry and gaseous state; the reaction products are then separated from the petroleum in any suitable manner, as by settling or filtering.

In accordance with one of the embodiments described in that patent, the petroleum is contacted with diluted sulfuric anhydrid and the temperature is maintained above the condensation point of the treating gas and below the dehydrogenization temperature of the petroleum. Evaporation losses are, however, liable to occur on account of the volume of the diluent, which is discharged at the exit of the apparatus; and, moreover, the exited gases may have a foul odor and cause damage to vegetation in the neighborhood.

In accordance with the process as described in my application S. N. 293,086, filed July 16, 1928, the petroleum is contacted with substantially concentrated sulfuric anhydrid while maintained in a dry and gaseous state; while in my application S. N. 293,087, filed July 16, 1928, the petroleum is contacted with non-gaseous sulfuric anhydrid; for instance, in a liquid state. In the processes described in those applications, the body of the petroleum under treatment is kept in circulation so as to rapidly distribute the contacting sulfuric anhydrid through the body. In this way, the heat liberated by the reaction resulting from the contact of the petroleum with the sulfuric anhydrid is rapidly disseminated, thereby preventing overheating. In accordance with one of the embodiments described in each of said applications, means are provided for maintaining the petroleum being contacted by the sulfuric anhydrid at a sufficiently low temperature to prevent local overheating. As pointed out in the applications, petroleum may be maintained at a sufficiently low temperature to absorb the heat evolved incident to the treatment to avoid deleterious effects by maintaining the temperature of the petroleum under treatment below the point where deleterious reactions take place.

Some oils have a tendency to form polymers, and they also contain substantial percentages of unsaturated hydro-carbons; it is, therefore, advantageous to treat such oils with sulfuric anhydrid at temperatures substantially below normal atmospheric temperature and even below the freezing point. Moreover, some oils contain oxygen and even molecules of absorbed or combined water, so that the oil is not in the desired anhydrous condition and, therefore, not inert to the sulfuric anhydrid, on account of the combined or entrained water.

One of the objects of this invention, therefore, is to provide a process whereby the petroleum is contacted with sulfuric anhydrid at a temperature substantially below normal, and even at a temperature below the freezing point.

Where, however, the temperature at which contact between the sulfuric anhydrid and the petroleum under treatment takes place is at such a low point, there is a tendency for condensation or solidification of the sulfuric anhydrid to take place; this may not only affect the efficiency of the operation, but may also result in suspension of operation.

Another object of this invention, therefore, is to provide a process of the character described, whereby the temperature of the contacting sulfuric anhydrid is maintained above its condensation or solidifying point while the temperature of the petroleum being contacted is maintained substantially below normal.

Further objects will appear from the detail description, in which will be set forth several embodiments of this invention; it is to be understood, however, that this invention is susceptible of various embodiments other than those described and referred to, without departing from the spirit of this invention.

In accordance with one embodiment of this invention, the body of the petroleum is held at a temperature substantially below normal atmospheric temperature and even below the freezing point of water. Into this petroleum body is led the sulfuric anhydrid, in order to secure contact for effecting the desired results. The entering sulfuric anhydrid is, however, insulated from the petroleum, so as to prevent condensation or solidification of the sulfuric anhydrid. This may be accomplished in any suitable manner, as by providing an insulating lagging around the conduit or pipe by which the sulfuric anhydrid is led into the body of the petroleum; in this way, condensation or solidification within the discharge outlet or orifice is prevented. In the process embodying this invention, the sulfuric anhydrid may be in the gaseous state and preferably concentrated, as described in application S. N. 293,086, or may be in the non-gaseous or liquid state, as described in application S. N. 293,087.

Figure 2:
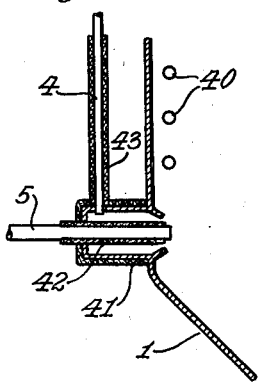
Figure 3:
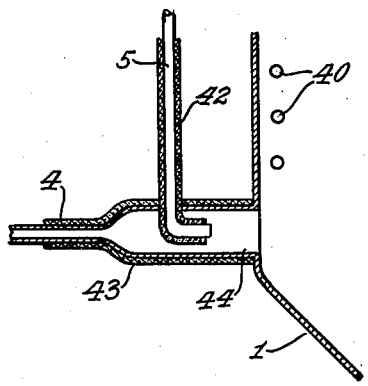
Figure 4:
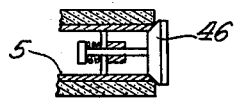

Figure 1 is a diagrammatic view of an apparatus adapted to carry out the process in accordance with one embodiment of this invention; and Figures 2, 3, and 4 are detail cross-sectional views at the contacting zone, showing the various means employed for securing insulation.

Referring, first, to Figure 1, 1 designates a container or tank, which may be provided with an agitator 2 driven from any suitable source of motive power 3. The petroleum may be delivered at the bottom of the tank by a suitable pipe 4, while the sulfuric anhydrid is delivered by a pipe 5. Where the sulfuric anhydrid is delivered to the treating zone in a dry and gaseous state, a suitable vessel 6, containing sulfuric anhydrid, is provided with a heater 60 to deliver the sulfuric anhydrid to the pipe 5. Where the sulfuric anhydrid is delivered to the contacting zone in a liquid state, the pipe 5 may be connected to a suitable source of supply with an interposed pump (not shown). The tank may be provided with a suitable valve 8, while a pipe 9 may lead from the top of the tank to the bottom of the settling tank 10 also provided with a valve 11. A pipe 12 may lead from the top of the tank 10 to a second treating tank 13 provided with an agitating device 14 and a valve 15. A pipe 16 may lead from the top of the tank 13 to the bottom of the tank 17, also provided with a valve 18. A pipe 19 may lead from the top of the tank 17 to a third treating tank 20, also provided with an agitator 21 and a valve 22. A pipe 23 may lead from the top of the tank 20 to the bottom of the settling tank 24 provided with a valve 25 and an outlet 26. Suitable valves may be provided as required in a manner well known to those skilled in the art; while vents or safety valves 27 may be provided, as usual in apparatus of this type. The tank 13 may be provided with an inlet pipe 28 and the tank 20 with an inlet 29.

The petroleum may lead from any suitable source of supply (not shown), where it may be cooled to the desired low temperature and led by a pipe 4 to the treating zone. The contents of the petroleum in the tank 1 may also be kept at the desired low temperature by the provision of a suitable cooling coil 40. As shown in Figure 2, the petroleum pipe 4 leads to a head or chamber 41 through which leads the sulfuric anhydrid pipe 5. This pipe is provided with a lagging of insulating material 42, such as asbestos or a similar insulating composition, this insulation extending up to the end of the pipe 5, in order to insulate this pipe and the sulfuric anhydrid passing therethrough from the cold oil within the chamber or head 41. If desired, this chamber, as well as the pipe 4, may also be provided with insulating lagging, as shown at 43. In accordance with another embodiment, as shown in Figure 3, the petroleum pipe 4 leads to a head or chamber 44, also connected with the tank 1, and both pipe and chamber may be lagged as shown at 43. The sulfuric anhydrid pipe 5 extends into this chamber and has a part or nozzle directed along the chamber and towards the tank 1, and this pipe 5, as well as the nozzle, is lagged as shown at 42. If desired, the end of the pipe or nozzle may be provided with a check valve 46 to prevent entrance of the cold petroleum into the pipe in case of stoppage or failure of the supply of sulfuric anhydrid.

In the operation of this apparatus, the sulfuric anhydrid and the petroleum are brought into intimate contact at the treating zone, which may be the bottom of the tank or one of the chambers 41 or 44, and the reaction generally takes place in that zone. The insulation of the entering sulfuric anhydrid from the petroleum, however, prevents condensation or solidification of the sulfuric anhydrid within the end of the pipe or the nozzle, or even at the orifice or outlet. The heat of reaction at the point of contact is, however, sufficient to permit the sulfuric anhydrid to enter the petroleum and immediately become dispersed throughout the body thereof before the low temperature of the petroleum body has time to effect solidification or condensation. The heat of reaction is, of course, absorbed, so that no deleterious actions can take place. This is advantageous; for in the case of treating a highly unsaturated oil and one high in sulfur, there might be a tendency at normal atmospheric temperatures for some of the resulting compounds to de-hydrogenate or pass into a sulphonic acid or sulphone form, which would remain within the oil. At low temperatures, however, these reactions are kept at a minimum, thereby reducing deleterious effects and reactions, while permitting the full strength and power of the sulfuric anhydrid to concentrate its reaction upon the sulfuric compounds. Moreover, as pointed out above, certain oils contain oxygen and even molecules of absorbed or combined water; however, by operating below the freezing point of the water, this water content or the oxygen content will be virtually withdrawn from the reacting and combining effects of the sulfuric anhydrid; in other words, the oil under treatment is placed in a super-anhydrous condition, and the water and oxygen present in the oil become inert to the sulfuric anhydrid.

By providing an agitator 2, the petroleum in the tank is kept in continuous agitation or circulation, so that the treated petroleum is disseminated from the zone of contact through the body, so that there is additional means for preventing overheating. This treated petroleum is carried by the pipe 9 to the settling tank 10 in which the reaction products settle and may be withdrawn through the valve 11, such reaction products as settle in the tank being also withdrawn through the valve 8. The treated petroleum passes from the tank 10 to the tank 13, to which sulfuric acid may be added by the pipe 28, as described in my Patent No. 1,929,489 granted October 10, 1933, in order to coagulate the remaining unseparated reaction products resulting from the contact of the sulfuric anhydrid with the petroleum; the sediment is withdrawn from this tank 13 through the valve 15. The treated petroleum passes from the tank 13 to the settling tank 17, from which the sediment is withdrawn by a valve 18. The treated petroleum may now pass from the tank 17 to the tank 20, where it may be subjected to caustic treatment, or in any other suitable manner, the treating medium being supplied by the pipe 29, and this treated petroleum then passes to the tank 24. In both tanks 23 and 24, the sediment may be withdrawn through the valves 22 and 25. The petroleum may then be subjected to a finishing operation in any manner desired and known to those skilled in the art.

It will be understood that various other embodiments of this invention may be employed and that the operations may be varied to suit requirements and standard practice in the art. It will, therefore, be understood that the particular embodiments illustrated are shown for the purpose of illustrating applications of this invention. In the described embodiments the temperature of the petroleum may be maintained at 25° F. or even below 0° F.

While the processes embodying this invention are particularly applicable to the treatment of petroleum products and even the lower boiling points in which evaporation losses are more liable to occur, an example of this being particularly gasoline, it will be understood that this invention is applicable to, in many of its phases, other petroleum products and to petroleum generally. Furthermore, while certain theories have been advanced it will be understood that these have been advanced for the purpose of facilitating the disclosure and not as being absolutely necessary or essential; it is, therefore, to be understood that this invention is not to be limited to any particular theory of operation. It is also obvious that various changes may be made in details without departing from the spirit of the invention; it is, therefore, to be understood that this invention is not to be limited to the specific details described.

Having thus described the invention what is claimed is:

1. The process of treating petroleum comprising, contacting the petroleum with fluid sulfuric anhydride while the temperature of the petroleum at the point of contact is sufficiently low to normally change the state of the sulfuric anhydride, and insulating the contacting sulfuric anhydride against the effect of the low petroleum temperature.

2. The process of treating petroleum comprising, leading fluid sulfuric anhydride into a body of petroleum while the petroleum at the point of contact is maintained at a temperature sufficiently low to normally change the state of the sulfuric anhydride, and insulating the entering sulfuric anhydride from the petroleum to prevent a change of state of the anhydride.

3. The process of treating petroleum comprising, leading sulfuric anhydride maintained at a temperature substantially above its condensation point into a body of oil maintained below atmospheric temperature at the point of contact, and insulating the entering sulfuric anhydride from the adjacent cold petroleum.

4. The process of treating petroleum comprising, leading fluid sulfuric anhydride maintained at a temperature substantially above its solidification point into a body of petroleum maintained below atmospheric temperature in the region of contact, and insulating the entering sulfuric anhydride from the adjacent cold petroleum.

5. The process of treating petroleum comprising, contacting concentrated sulfuric anhydride while maintained in a dry and gaseous state with petroleum maintained in the region of contact, at a temperature below the freezing point of water, and preventing the cold petroleum surrounding the incoming anhydride from chilling the anhydride sufficiently to change the state thereof.

WRIGHT W. GARY.